United States Patent
Li et al.

(10) Patent No.: US 10,968,632 B2
(45) Date of Patent: Apr. 6, 2021

(54) CERAMIC GRANULES WITH HIGH UV OPACITY AND HIGH SOLAR REFLECTANCE

(71) Applicant: SHIJIAZHUANG NIKKA MINTECH CO., LTD., Shijiazhuang (CN)

(72) Inventors: Zhijie Li, Shijiazhuang (CN); Hongwei Lu, Shijiazhuang (CN)

(73) Assignee: SHIJIAZHUANG NIKKA MINTECH CO., LTD., Hebei (CN)

( * ) Notice: Subject to any disclaimer, the term of this patent is extended or adjusted under 35 U.S.C. 154(b) by 64 days.

(21) Appl. No.: 16/124,058

(22) Filed: Sep. 6, 2018

(65) Prior Publication Data

US 2020/0080312 A1    Mar. 12, 2020

(51) Int. Cl.
*E04D 1/04* (2006.01)
*C04B 35/626* (2006.01)
*E04D 1/00* (2006.01)
*C04B 111/80* (2006.01)

(52) U.S. Cl.
CPC .......... *E04D 1/04* (2013.01); *C04B 35/62695* (2013.01); *C04B 2111/80* (2013.01); *E04D 2001/005* (2013.01)

(58) Field of Classification Search
CPC .................................................. C04B 2111/80
See application file for complete search history.

(56) References Cited

U.S. PATENT DOCUMENTS

| 9,422,719 | B2 * | 8/2016 | Shiao ................. E04D 1/28 |
| 9,714,512 | B2 | 7/2017 | Sexauer et al. |
| 9,944,562 | B2 | 4/2018 | Li et al. |
| 2010/0240526 | A1 * | 9/2010 | Hong ................. B82Y 30/00 502/84 |
| 2014/0248467 | A1 * | 9/2014 | Shiao ................. C03C 10/00 428/149 |
| 2014/0271440 | A1 * | 9/2014 | Constantz .......... C01F 11/181 423/430 |
| 2015/0192698 | A1 | 7/2015 | Joedicke et al. |

* cited by examiner

*Primary Examiner* — Alexandre F Ferre
(74) *Attorney, Agent, or Firm* — Mintz Levin Cohn Ferris Glovsky and Popeo, P.C.

(57) ABSTRACT

The invention relates to ceramic granules with a high UV opacity and high solar reflectance, which is produced by forming a calcined clay mineral powder into green body and re-calcining, featured with a water absorption of 15-35%; ≥97% crystalline content and 90-100% UV opacity. The invention further relates to a method for preparing ceramic granules with a high UV opacity and high solar reflectance and the use thereof for reflectance-improving application on building surface for the purpose of energy conservation.

16 Claims, 2 Drawing Sheets

CERAMIC GRANULES WITH HIGH UV OPACITY AND HIGH SOLAR REFLECTANCE

TECHNICAL FIELD

The invention relates to ceramic granules with high UV opacity and high solar reflectance as well as a method for producing the same. The ceramic granules are suitable for reflectance-improving applications on building surface for the energy conservation purpose.

BACKGROUND OF THE INVENTION

The literatures are cited in the present description for the purpose of describing the state of the art to which the present invention pertains, and are incorporated herein by reference in their entire disclosures.

In order to reduce energy consumption, building codes issued in California, USA, require that the solar reflectance of low-slope roofs should be 70% min. It is a very effective heat-shielding technique to adhere highly solar reflective granules on the surface of asphalt roofing materials. Compared with other reflective materials such as plastics, metals, and organic coatings, highly solar reflective granules are featured by low costs and high aging resistance. Most of commercially available white granules, such as quartz, calcite, calcined kaolin, synthetic ceramic granules usually have high solar reflectivity when measured as bulk granules, but have a rather low solar reflectivity after being applied on black substrate. Furthermore, white granules tend to discolor due to significant oil absorption, which in turn reduces its solar reflectivity. In addition, the asphalt substrate to which the granules are embedded would easily degrade due to the low UV opacity of the granules.

White granules used on the roof are required to have high whiteness, which significantly limits the source of white granules available for roofing. There are mainly two kinds of highly solar reflective granules available on the market, in which one is obtained by directly calcining special raw mineral ore, and another one is obtained by calcining milled raw minerals powder with the addition of a certain amount of flux/fluxing agent. As to the former one, the raw mineral tends to change its color during calcination, making it difficult to control the quality of the final product. This further limits the source of raw materials.

U.S. Pat. No. 9,714,512B discloses a cool roofing system comprising highly reflective calcined kaolin granules with solar reflectance of 80-92%. The calcined kaolin granules are applied to a roofing substrate after being coated with a polymeric organic coating, forming a roof system with solar reflectance of at least 70%. The bright white calcined kaolin granules in this invention are restrained by the locations from which the raw materials are mined, and limit their application on the market.

U.S. Pat. No. 9,944,562 B discloses highly reflective ceramic granules comprising core particulates and at least one layer of coating, wherein the sand particulates comprise calcined ammonium illite obtained by calcining ammonium illite ore at 700-1200° C., and the preparation method of the same. The sand core granules, after being coated with an inorganic coating, are calcined at 800 to 1200° C. to obtain ceramic granules. The ceramic granules have a particle size of 0.1 to 3.5 mm, with a solar reflectance of at least 80% and a staining index DL* of less than 6%.

US20150192698 discloses highly reflective ultra-white roofing granules with a solar reflectance of at least 80%, which are prepared by using a homogeneous mixture comprising clay, sintered material and optionally quartz particles.

The market demands for a new roofing granule with high UV opacity and high solar reflectance with mass supply. On the other hand, it is desirable that the raw materials for the preparation of ceramic granules can be easily obtained economically. It is also desirable that the ceramic granules have superior performance in high porosity, high whiteness, high reflectivity, and low consumption and the like.

Furthermore, it is desirable to prepare ceramic granules with simple procedures. It is also desirable to produce a final roofing product that has high solar reflectance, long service life, and ease of maintenance.

SUMMARY

It was found by the inventors that for clay-based silica-alumina minerals, high solar reflective granules with high UV opacity tend to result in high solar reflectance after applied on a black substrate.

According to one or more embodiments of the present invention, the ceramic granules are produced by forming a calcined clay mineral powder into green body and re-calcining. It was found by the inventors that the ceramic granules thus produced have high crystalline content, high UV opacity and appropriate crushing strength. Surprisingly, it has also been found by the inventors that such ceramic granules are capable of achieving high solar reflectance when being applied on asphalt substrate. According to one or more aspects of the present invention, ceramic granules with beneficial properties are obtained by controlling, for example, the particle size of the raw material, the whiteness, and parameters of the forming and calcining process.

In one aspect of the invention, calcined clay is used as raw material for the ceramic granules. The raw material is widely available and the quality of the products can be easily controlled. Calcined clay powder is widely used in the ceramic industry, refractory industry, filler industry and the like, but it has not been reported that it can be used to produce highly reflective granules for roofing.

In one aspect of the invention, ceramic granules with a high UV opacity and high solar reflectance are produced by forming a calcined clay mineral powder into green body and then re-calcined, with water absorption between 15-35%, preferably 20-30%; crystalline content≥97%, preferably 97%-100%; and UV opacity between 90%-100%, preferably 92%-100%, more preferably 96-100%.

According to one embodiment, there is a method provided for preparing the ceramic granules, comprising the steps of: a) providing a suitable calcined clay powder as raw material; b) mixing the raw material with a certain proportion of water and forming the raw material into a green body; and c) calcining the green body at the temperature of 1100-1400° C.; d) crushing the calcined material to obtain granules; e) optionally surface treating the granules.

In one aspect of the invention, it introduces the use of the ceramic granules for reflectance-improving application on building surface for the purpose of energy conservation.

DETAILED DESCRIPTION OF THE INVENTION

Figure 1:
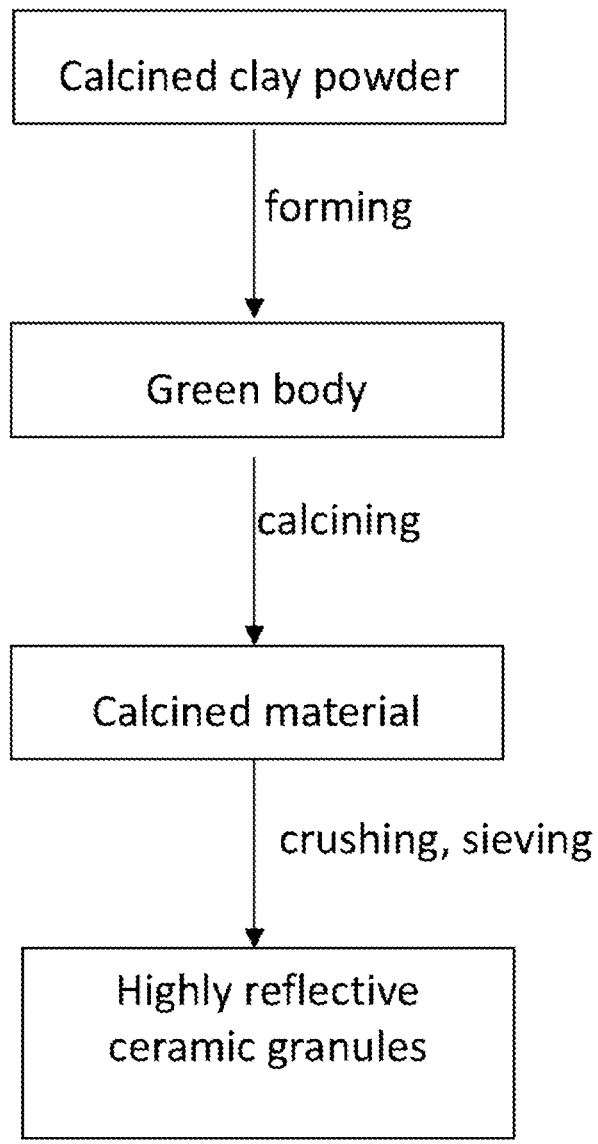
FIG. 1 shows a flow chart for preparing highly reflective ceramic granules in accordance with one aspect of the present invention.

The preparation of highly reflective ceramic granules in accordance with one aspect of the present invention is illustrated below referring to FIG. 1.

The Calcined clay powders, to which water is added, are mixed homogeneously and then formed into green bodies. The green bodies are calcined at high temperature in kiln. The calcined material is crushed and sieved to obtain highly reflective ceramic granules.

Figure 2:
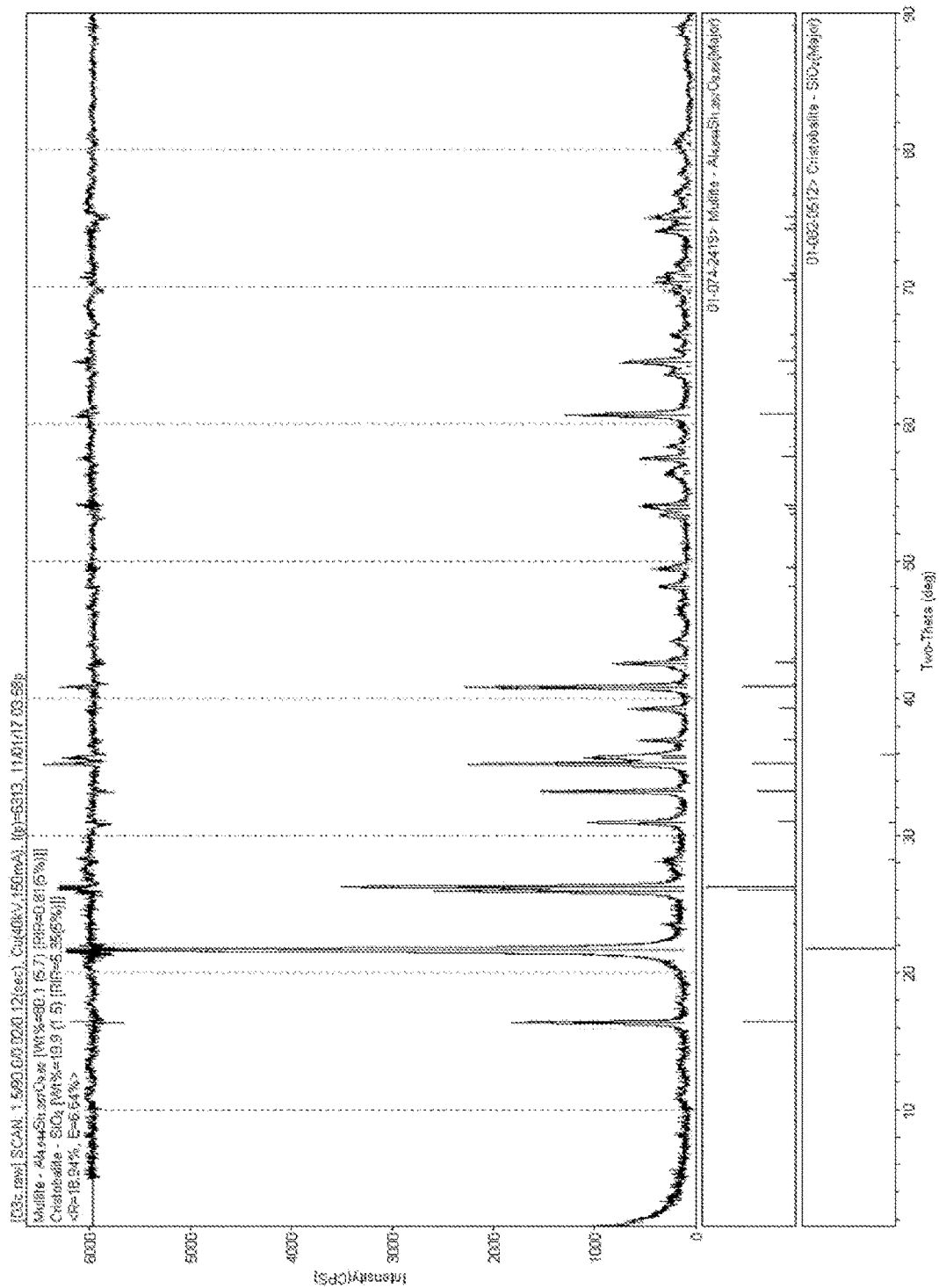
FIG. 2 shows an X-ray diffraction spectrum of ceramic granules according to an embodiment of the present invention.

FIG. 2 shows an X-ray diffraction spectrum of ceramic granules obtained according to Experiment No. 1 of the present invention. As can be seen from the figure, the ceramic granules have a crystalline content of 100%.

Definitions

The following definitions are used herein to further define and describe the present disclosure. Unless otherwise defined in specific instance, these definitions apply to the terms as used throughout the present disclosure.

Unless defined otherwise, all technical and scientific terms used herein have the same meaning as commonly understood by those skilled in the art to which the present invention pertains. In case of conflict, the present specification, including the definitions given herein, shall prevail.

Unless otherwise indicated, all percentages, parts, ratios, and the like amounts used herein are defined by weight.

In the present invention, the UV opacity is used to indicate the opacity of an object to light within the ultraviolet range.

In the present invention, solar reflectance (SR) is used to characterize the ability of a material to reflect back solar radiation incident on its surface.

In the present invention, $D_{50}$ representing an average particle size of the granules is a median diameter of the 50% cumulative volume in a particle size distribution curve measured by the laser diffraction scattering method.

The crushing index indicates the ability of the granules to resist crushing, which may be used to evaluate the corresponding strength of the granules indirectly.

The water absorption of mineral materials depends mainly on their porosity. In the present invention, the water absorption is used to indicate the porosity of the ceramic granules.

According to one embodiment, clay suitable for the invention comprises halloysite, dickite, kaolin, montmorillonite, allophane, ammonium illite, pyrophyllite or a mixture of one or more thereof. Calcined clay is commercially available from suppliers including, for example, Hebei Chida Manufacture and Trade Co., Ltd.

According to one embodiment, the calcined clay powder is selected to have a particle size $D_{50}$ of between 0.01 and 8 μm, preferably between 0.1 and 6 μm, more preferably between 0.5 and 5 μm.

The color space is a color system represented by L*, a*, and b*. In the present invention, the standard used by the L*a*b* color system is the CIE color model, where L* represents the lightness, with L*=0 indicating black and L*=100 indicating white. The a* value represents the red-green component of the color, with green in the negative direction and red in the positive direction. The b* value represents the yellow-blue component of the color, with blue in the negative direction and yellow in the positive direction.

According to one embodiment, the color values of the calcined clay powder are selected such that L* is between 80 and 100, a* is between −5 and +5, and b* is between 1 and 10. According to one embodiment, the color values of the calcined clay powder are: L* of between 85 and 100, a* of between −3 and +3, and b* of between 1 and 9. According to another aspect of the present invention, the color values of the calcined clay powder are: L* of between 88 and 100, a* of between −1 and +1, and b* of between 2 and 8. The powder material thus selected has a small content of light absorbing material.

According to one embodiment, the crushing index of the ceramic granules is between 15% and 35%, preferably between 20% and 30%.

According to one embodiment, the solar reflectance of the ceramic granules is between 82% and 90%.

According to one embodiment, the ceramic granules have a solar reflectance of from 75% to 85% when being applied to an asphalt substrate at a coverage of 90% or more.

According to another embodiment, the ceramic granules have a solar reflectance of 80% to 90% when being applied to a foam (such as polyurethane) substrate at a coverage of 90% or more.

According to one embodiment, no flux/fluxing agent is needed in the course of the re-calcination.

According to one embodiment, the calcined clay powder is formed to green body and then calcined to obtain granules having a certain strength and retaining a certain amount of pores.

The amount of water required for the forming step itself is known by those skilled in the art. The amount of water added may be 0% to 100%, preferably 5% to 60%, more preferably 10% to 50% relative to the weight of the calcined clay powder.

Forming Pressure and Forming Method

The forming/moulding pressure has influence on the strength and porosity of the ceramic granules. High pressure leads to high strength and low porosity of the granules.

The forming/moulding pressure for the green body to be calcined is in the range of 0-1000 MPa.

High pressure sets forth a high requirement on the forming/moulding equipment, rendering a higher equipment investment and a more serious wear. On the other hand, it is difficult to obtain suitable strength of the ceramic granules when the moulding pressure is too low.

Generally, the forming/moulding pressure can be selected between 50 to 200 MPa.

The forming/moulding of the powder can be conducted, for example, by casting, pressure moulding or rolling granulation.

Green Body Calcination

The green body can be calcined with heat sources such as electricity, coal, natural gas, fuel oil, etc. The calcining kiln can be a shuttle kiln, a tunnel kiln, a roller kiln, a rotary kiln and the like. If the calcination temperature is too low, the strength of the prepared granules is insufficient. If the calcination temperature is too high, the number of pores is gradually reduced, which impacts the reflection of the granules to solar radiation. According to one aspect of the invention, the green body is calcined at a temperature from 1100 to 1400° C., preferably from 1150 to 1350° C.

Crushing and Sieving

The calcined material obtained by calcining the green body can be crushed with a jaw crusher, a hammer crusher, a cone crusher, a roll crusher, an impact crusher, a mill, or a combination thereof. The ceramic granules obtained by crushing can be sieved to adjust their particle size distribution. As for the sieving device, a fixed sieve, a movable sieve, a vibrating sieve or a combination thereof can be used. In order to make the ceramic granules suitable for roofing material, they are processed into granules having a particle size of from about 0.1 to 3.5 mm, preferably from about 0.3 to 2.3 mm, more preferably from about 0.5 to 2 mm.

Surface Treatment

According to one embodiment, the ceramic granules can be further surface treated to obtain functions such as water repellency, stain resistance and algae resistance. The surface treatment generally includes surface treatment selected from inorganic coating, organic coating, water repellent or a combination of more than one above treatment thereof.

According to one embodiment, the inorganic coating is a liquid inorganic coating selected from at least one of silicate, aluminum phosphate, silica sol, and aluminum sol. The silicate is selected from the group consisting of sodium silicate, potassium silicate, aluminum silicate, lithium silicate or a mixture of one or more thereof.

According to one embodiment, the organic coating is selected from the group consisting of acrylics and silicone-acrylic coating. The water repellent may be selected from the group consisting of silanes, silicones, and fluorine-containing water repellents.

The inorganic coating, the organic coating or the water repellent may further comprise one or more selected from the group consisting of pigments, algaecides, insecticides, self-cleaning agents, viscosity modifiers, fluxing agents, flame retardants, surface tension modifier and anti-aging agents.

According to one embodiment, the ceramic granules further comprise an additional coating obtained by secondary coating with an organic coating and/or a water repellent, wherein the organic coating is a resin coating or an emulsion coating, and the water repellent is a silicon-containing water repellent or a fluorine-containing water repellent.

Applications

According to one embodiment, the ceramic granules can be applied to the surface layer of a roofing material with substrate made of cement, asphalt, polyurethane foam or metal, so as to increase the roof reflectance to solar radiation. The ceramic granules have a solar reflectance of 75% to 85% when being applied on asphalt substrate at a coverage of 90% or more. According to another embodiment, the ceramic granules have a solar reflectance of 80% to 90% when being applied to foam substrate (such as polyurethane foam) at a coverage of 90% or more.

According to one embodiment, the ceramic granules can also be used in stone texture coating for buildings to produce a highly reflective coating layer, which has the same effect as white granules.

EXAMPLES

The following examples are provided to describe the invention in more detail. These examples, illustrating the specific embodiments and preferred technique for implementing the present invention, are intended to illustrate but no to limit the invention.

General Description of the Testing Methods

Whiteness

The color value was measured with a colorimeter (Model SC-100, manufactured by Beijing Kangguang Optical Instrument Co., Ltd.).

Take a certain amount of a sample and put into a tablet machine (an accessory of the colorimeter, Model SC-100, manufactured by Beijing Kangguang Optical Instrument Co., Ltd), to be pressed into a tablet. The tablet is measured for its whiteness with the colorimeter at the flatter side of the tablet. The values of L*, a* and b* were measured for three times and an average value was calculated.

Particle Size $D_{50}$

The particle size $D_{50}$ was measured with a laser particle size analyzer (Model BT-9300H, manufactured by Dandong Bettersize Instrument Co., Ltd.)

Water Absorption

Take 50 g ceramic granules, and place it in a beaker with water, and stirred the mixture with a glass rod for 10 s. A piece of cotton cloth was immersed in water, wringed until no water dripping and then unfolded on a table. The granules immersed in water were removed from the beaker and laid on the cotton cloth. The granules were wiped back and forth with the cotton cloth until no water stains on the surface of the granules can be observed (the granules shall be loose and not sticky). Weigh approximately 5-10 g (m1) of the wiped ceramic granules with a scale accurate to 0.1 mg and place into a beaker. The granules were dried in a 105° C. oven to constant weight. The weight (m2) of the ceramic granules after drying was measured. The water absorption is calculated according to the following equation:

$$\text{Water absorption}=(m1-m2)/m2*100\%.$$

Crystalline Content

The crystalline content was measured with an X-ray diffractometer (Model D/MAX 2500, Rigaku Corporation, Japan), and calculated.

Crushing Index

The crushing index was measured on ceramic granules with size between 1.7 mm and 1.18 mm according to the Part 6.12.2 of GB/T 14684-2001.

UV Opacity

UV opacity was measured similar to ASTM $D_{1866}$-79.

Instruments: flood lamp box, standard photographic step tablets (Kodak photographic step tablets, No. 2, calibrated), filter (UV-light transparent and visible-light absorbing glass, model ZWB1, Nantong Ruisen Optical Element Technology Co., Ltd), camera (Panasonic DMC-GF5), template (a perforated board with 110 holes).

Procedure

The flood lamp box consists of a box and a flood lamp (PHILIPS, Model: RVP350 L 1XHPI-T 400 W IC220V50 Hz SP SY) installed in the box. There was a square opening on the top of the box, and the light emitted from the flood lamp was illuminated upward through the square opening. The filter was fixed above the square opening with a filter slide, and the template was placed above the filter. Turn on the flood lamp for 10 minutes to warm up the apparatus.

Screen the ceramic granules using a Tyler 10 mesh and Tyler 12 mesh screen and take 5 g sample of 10-12 mesh. Place one granule in each space of the template with tweezers. Adjust the granule to make sure each hole is completely covered and there was no light transmit. Then, place the upper template and check for light transmission. If there was light transmitted, adjusted the granule until there was no light transmitting through the hole.

A standard graphical step tablets was carefully cut lengthwise down the center to produce two equal tablets. One tablet was laid on the other one so that the 14th step of the bottom tablets was situated below the 1st step of the upper tablets (Note: Don't count the clear area. The dark steps of both step tablets should on the left side. Secure the two step tablets with two tapes on both ends). The combined step tablets was placed on the 10 holes at the bottom of the lower template. Make sure the $14^{th}$ step of the bottom tablet and the 1st step of the upper tablet are squarely over the 5th hole from the left. Secure the tablets with tapes. Make sure all the holes are completely covered by the step tablets and that the tape does not block the holes.

Fix a camera right above the square opening with a camera holder. Turn off the room lights and make sure it is in completely darkness. Take photos with the camera.

Open the photos with Photoshop software in a computer. Adjust the contrast of the photos so that the brightness of the 5th hole from the left of the step tablets is barely seen, and count the number of bright spots on the photo (the number of holes n). Calculate UV opacity according to the following equation:

UV opacity=(number of granules placed−number of bright spots)/100*100%=(100−n)/100*100%.

Solar Reflectance (Ceramic Granules)

The solar reflectance was measured in accordance with the ASTM-C1549 standard. The reflectance of the sample was measured with a solar spectrum reflectometer (model SSR-ER, A&D, USA). Set the reflectometer in b891 output mode for measurement. 50 g granules sample was placed in a flat sample tray, and then levelled and smoothed with a ruler. Solar reflectance was measured on three points randomly selected on the surface.

Solar Reflectance (After Being Applied to Asphalt Substrate)

The solar reflectance was measured in accordance with the ASTM-C1549 standard. The reflectance of the sample was measured with a solar spectrum reflectometer (model SSR-ER, A&D, USA). Adjust the reflectometer to the b891 output mode for measurement. A sufficient amount of granules were evenly spread on the low-melting sticky asphalt board, flattened, and the loose granules on the surface were removed. Solar reflectance was measured on three points randomly selected on the surface of the asphalt substrate.

Experiment Series 1

Calcined clay powders, uncalcined powder and raw ore from China Hebei Chida Manufacture and Trade Co., Ltd. were employed, the properties of which are summarized in Table 1.

TABLE 1

Properties of raw materials employed

| Calcined clay powder number | Mineral | Powder $D_{50}$ value, μm | whiteness L* | whiteness a* | whiteness b* |
|---|---|---|---|---|---|
| 1 | Calcined ammonium illite powder | 0.5 μm | 93 | 0 | 3 |
| 2 | Calcined ammonium illite powder | 4.0 μm | 93 | 0 | 3 |
| 3 | Calcined ammonium illite powder | 10 μm | 93 | 0 | 3 |
| 4 | Calcined kaolin powder | 4.0 μm | 93 | 1 | 3 |
| 1a | ammonium illite powder (uncalcined) | 0.5 μm | 50 | 0.7 | 3.4 |
| 2a | ammonium illite powder (uncalcined) | 4.0 μm | 50 | 0.7 | 3.4 |
| 3a | ammonium illite powder (uncalcined) | 10 μm | 50 | 0.7 | 3.4 |
| 1b | ammonium illite ore (uncalcined) | / | 45 | 0.8 | 3.6 |

The preparation of Ceramic granules from calcined clay powder was as follows.

Place 10 kg calcined clay powders listed in the table 1 and 2 kg water into a mixer [Gongyi City Zhanjie Wandu Machinery Factory, Model φ600] to mix evenly. The mixed powders were pressed into 240*115*53 mm green bodies with a 100 tons press [Beijing Zhongcai Jianke Industry & Trade Co., Ltd., model ZCY-200]. The green bodies were then calcined in a high temperature furnace at 1250° C. [Luoyang Hengli Kiln Co., Ltd., model HLX17C] for 10 h. After cooling, the calcined materials were crushed with a crusher [Hebi city Three Long Electronic Technology Co., Ltd., Model CP-180×150] to granules with the size of about 0.5-2 mm. The granules were tested with respect to their UV opacity, SR (ceramic granules), and SR (after applied to asphalt substrate).

The preparation of Ceramic granules from uncalcined clay powder is as follow.

The preparation of ceramic granules from uncalcined clay powder was the same as with calcined clay powder, except the calcining time of the former is about 30 hr. The purpose of extending the calcination time is to turn the uncalcined clay powder into white.

Ceramic granules were prepared from raw mineral ore according to the following procedure:

About 10 kg of the ore were weighed and put into a high temperature furnace[Luoyang Hengli Kiln Co., Ltd., Model HLX17C]. The ore were heated therein at 1250° C. for 30 h. After cooling, the ore was crushed with a crusher [Hebi City Three Long Electronic Technology Co., Ltd., Model CP-180×150] to about 0.5-2 mm granules. The granules were tested with respect to their UV opacity, SR (granules as produced), and SR (after applied to asphalt substrate).

TABLE 2

Properties of the ceramic granules

| Experiment No. | Powder/ore used | UV opacity % | Granules, SR % | Granules on the asphalt substrate, SR % | Crystalline content % |
|---|---|---|---|---|---|
| 1 | 1 | 100 | 90 | 83 | 100 |
| 2 | 2 | 99 | 89 | 81 | 100 |
| 3 | 3 | 85 | 88 | 74 | 100 |
| 4 | 4 | 99 | 88 | 81 | 100 |
| 5 | 1a | 100 | 83 | 74 | 100 |
| 6 | 2a | 99 | 80 | 73 | 99 |
| 7 | 3a | 82 | 80 | 70 | 99 |
| 8 | 1b | 78 | 82 | 67 | 99 |

As can be seen from the above table, even with different UV opacity, the granules have similar SR values. However, when applied to asphalt substrate, the granules of higher UV opacity tend to result in higher solar reflectance.

Experiment Series 2

Procedure for Preparing the Ceramic Granules:

Place 10 kg of calcined clay powder listed as No. 1 in table 1 and 2 kg water into a mixer [Gongyi City Zhanjie Wandu Machinery Factory, Model φ600] and mix evenly. The mixed powders were pressed into 240*115*53 mm green bodies with a 100 tons press [Beijing Zhongcai Jianke Industry & Trade Co., Ltd., Model ZCY-200]. The green bodies were then heated in a high temperature furnace [Luoyang Hengli Kiln Co., Ltd., Model HLX17C] for 10 h at temperature of 1050° C., 1150° C., 1280° C. and 1450° C., respectively. After cooling, the bodies were crushed with a crusher [Hebi city Three Long Electronic Technology Co., Ltd., Model CP-180×150] to granules with the size of about 0.5-2 mm. The granules were tested for UV opacity, SR (ceramic granules), SR (granules on asphalt substrate) and the crushing index to evaluate the influence of the calcination temperature.

TABLE 3

Properties of the ceramic granules

| Calcination temperature | Water absorption % | UV opacity % | Granules SR % | Granules on the asphalt substrate, SR % | Crushing index % | Crystalline content % |
|---|---|---|---|---|---|---|
| 1050 | 50 | 100 | 90 | 82 | 40 | 95 |
| 1150 | 30 | 100 | 90 | 82 | 30 | 98 |
| 1280 | 25 | 99 | 88 | 80 | 20 | 100 |
| 1450 | 10 | 80 | 88 | 70 | 15 | 100 |

As can be seen from the above table, a low calcination temperature tends to result in low granule strength, while a high calcination temperature tends to result in low UV opacity.

The invention claimed is:

1. Ceramic granules having a high UV opacity and high solar reflectance, produced by forming a calcined clay mineral powder and re-calcining, wherein the ceramic granules are characterized by:
   15-35% water absorption;
   ≥97% crystalline content;
   90-100% UV opacity; and
   a solar reflectance of between 82% and 90%.

2. The ceramic granules according to claim 1, which have a water absorption of between 20% and 30%.

3. The ceramic granules according to claim 1, which have a crystalline content of between 97% and 100%.

4. The ceramic granules according to claim 1, which have a crushing index of from 15% to 35%.

5. The ceramic granules according to claim 1, which have a UV opacity of between 92% and 100%.

6. Ceramic granules having a high UV opacity and high solar reflectance, produced by forming a calcined clay mineral powder and re-calcining, wherein the ceramic granules are characterized by:
   15-35% water absorption;
   ≥97% crystalline content;
   90-100% UV opacity; and
   a solar reflectance of from 75% to 85% when being applied to asphalt substrate at a coverage of 90% or more.

7. Ceramic granules having a high UV opacity and high solar reflectance, produced by forming a calcined clay mineral powder and re-calcining, wherein the ceramic granules are characterized by:
   15-35% water absorption;
   ≥97% crystalline content;
   90-100% UV opacity; and
   a solar reflectance of between 80% and 90% when being applied to the surface of a polyurethane foam substrate at a coverage of 90% or more.

8. The ceramic granules according to claim 1, wherein the clay comprises dickite, kaolin, montmorillonite, pyrophyllite, halloysite, allophane, ammonium illite or a mixture of one or more thereof.

9. The ceramic granules according to claim 1, wherein the calcined clay powder has a particle size $D_{50}$ of between 0.01 μm and 8 μm.

10. The ceramic granules according to claim 1, wherein the calcined clay powder has an L* between 85 and 100, a* between −3 and +3 and b* between 1 and 9.

11. A system, comprising:
   a substrate formed of an asphalt substrate, a polyurethane foam substrate or metal substrate; and
   the ceramic granules of claim 1 applied to a surface of the substrate.

12. A method for the preparation of ceramic granules having a high UV opacity and high solar reflectance, comprising the steps of:
   a) providing a calcined clay powder as raw material;
   b) mixing the raw material with a certain proportion of water and forming the raw material into a green body;
   c) calcining the green body at temperature of 1100-1400° C.; and
   d) crushing the calcined material to obtain the ceramic granules, wherein the ceramic granules are characterized by:
   15-35% water absorption;
   ≥97% crystalline content;
   90-100% UV opacity; and
   a solar reflectance of between 82% and 90%.

13. The method according to claim 12, wherein the clay comprises dickite, kaolin, montmorillonite, pyrophyllite, halloysite, allophane, ammonium illite or a mixture of one or more thereof.

14. The method according to claim 12, wherein the calcined clay powder has a particle size $D_{50}$ of between 0.01 μand 8 μm.

15. The method according to claim 12, wherein the calcined clay powder has an L* between 85 and 100, a* between −3 and +3, and b* between 1 and 9.

16. The method according to claim 12, further comprising surface treatment of the granules with an inorganic coating, an organic coating, a water repellent, or a combination of one or more thereof.

* * * * *